United States Patent
Gao et al.

(10) Patent No.: US 9,454,344 B1
(45) Date of Patent: Sep. 27, 2016

(54) TEMPORAL USER-DEFINED FUNCTIONS

(75) Inventors: Like Gao, San Diego, CA (US);
Michael L. Reed, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 202 days.

(21) Appl. No.: 13/608,693

(22) Filed: Sep. 10, 2012

(51) Int. Cl.
G06F 7/00 (2006.01)
G06F 17/30 (2006.01)

(52) U.S. Cl.
CPC ............... *G06F 7/00* (2013.01); *G06F 17/30* (2013.01)

(58) Field of Classification Search
CPC ............... G06F 17/30144; G06F 17/30289; G06F 17/3056; G06F 17/30958
See application file for complete search history.

(56) References Cited

U.S. PATENT DOCUMENTS

| | | | | |
|---|---|---|---|---|
| 6,684,215 | B1 * | 1/2004 | Saracco | 707/702 |
| 8,332,373 | B1 * | 12/2012 | Milby | 707/702 |
| 2005/0160100 | A1 * | 7/2005 | Eikenhorst et al. | 707/100 |
| 2006/0041544 | A1 * | 2/2006 | Santosuosso | G06F 17/30424 |
| 2006/0288052 | A1 * | 12/2006 | Chen et al. | 707/203 |
| 2008/0098045 | A1 * | 4/2008 | Radhakrishnan et al. | 707/203 |
| 2009/0106218 | A1 * | 4/2009 | Srinivasan | G06F 17/30516 |
| 2010/0121863 | A1 * | 5/2010 | Reed et al. | 707/758 |
| 2011/0055287 | A1 * | 3/2011 | Sun | G06F 17/30557 707/805 |
| 2011/0071693 | A1 * | 3/2011 | Sun et al. | 700/291 |
| 2011/0320419 | A1 * | 12/2011 | Johnston et al. | 707/703 |
| 2012/0017205 | A1 * | 1/2012 | Mahajan | 717/170 |

* cited by examiner

*Primary Examiner* — Tuan A Pham
(74) *Attorney, Agent, or Firm* — Randy L. Campbell, Jr.

(57) ABSTRACT

A database system may include a memory device configured to store a database dictionary and a processor in communication with the storage device. The processor may be configured to receive a temporal user-defined function (UDF) and to store, in the database dictionary, the temporal UDF and a period of time over which to apply the temporal UDF. A method may include receiving a temporal UDF and include determining a period of time over which to apply the temporal UDF. The method may further include storing the temporal UDF and the period of time over which to apply the temporal UDF. A computer-readable medium may include instructions to receive a temporal UDF and instructions to store the temporal UDF. The computer-readable medium may further include instructions to determine a period of applicability of the temporal UDF and instructions to store the period of applicability in a storage device.

20 Claims, 6 Drawing Sheets

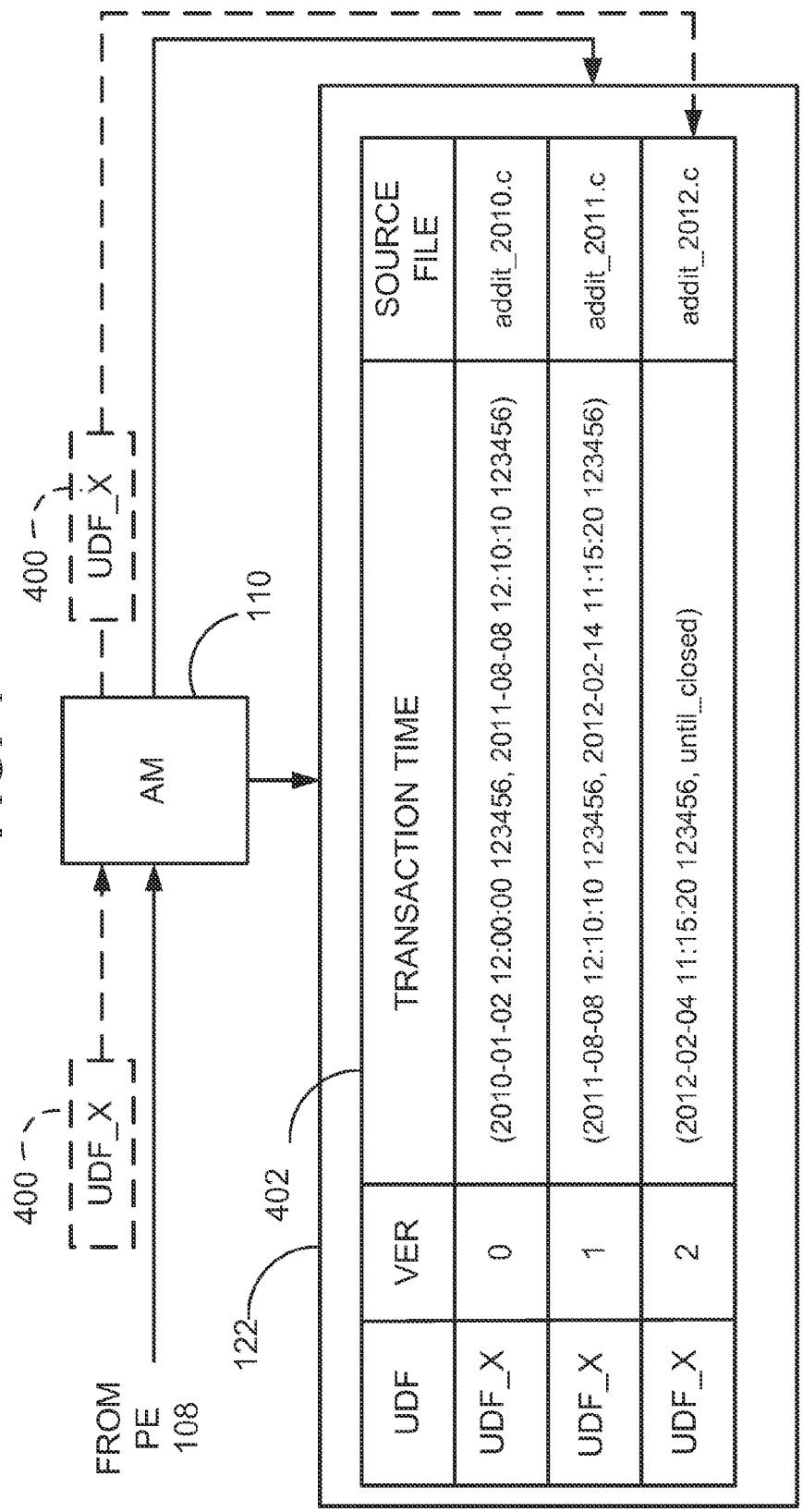

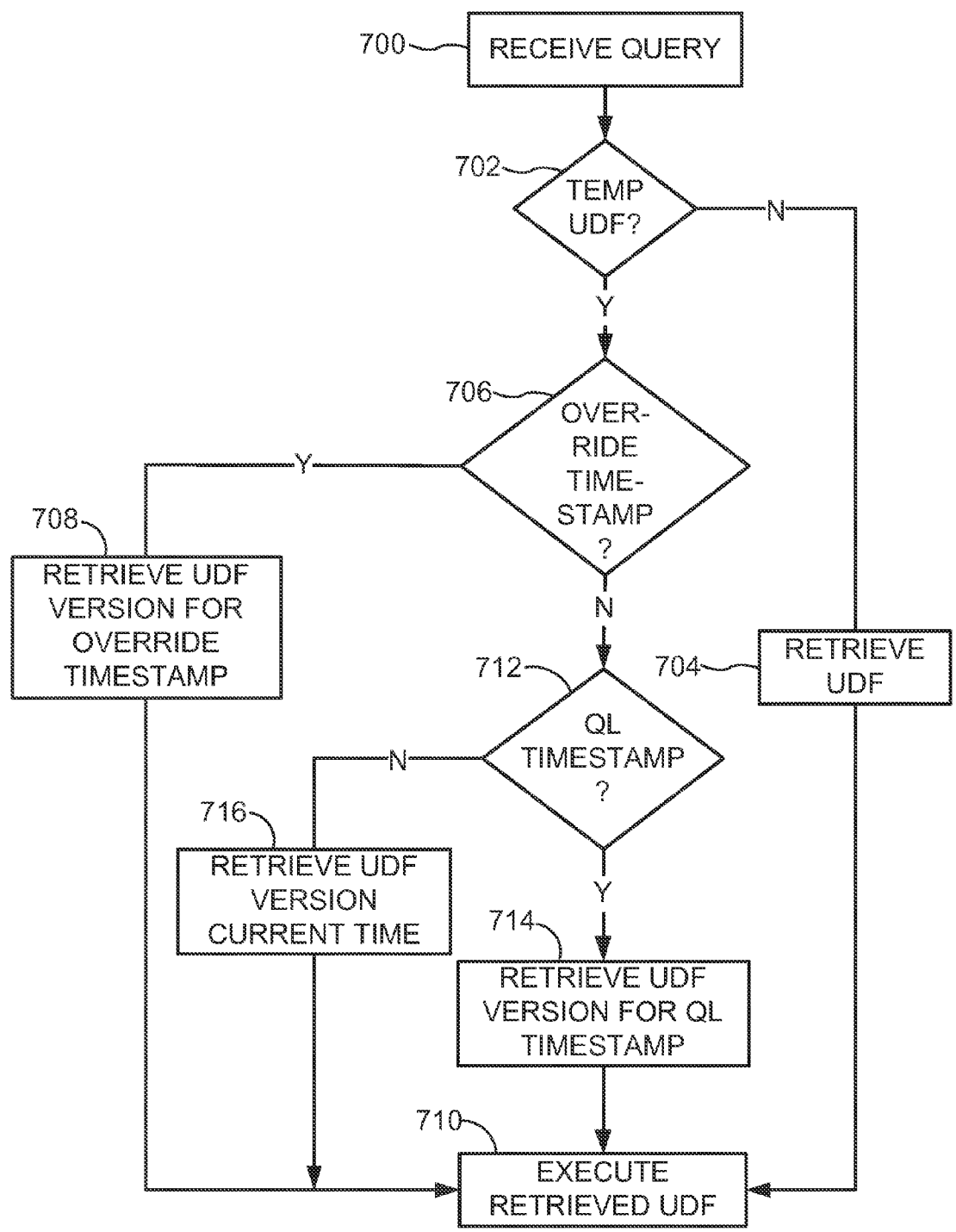

TEMPORAL USER-DEFINED FUNCTIONS

BACKGROUND

1. Technical Field

The present disclosure relates generally to user-defined functions, and more particularly to, temporal user-defined functions.

2. Related Art

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

An RBDMS may be a temporal database that allows time-varying data to be maintained. Temporal databases store and query data with time-based qualities. Use of these time-based qualities allows users to produce the same query results even when the underlying data sources change. However, if a query contains a user-defined function (UDF), then the users have to ensure that the UDFs in use have not changed over the time, otherwise they may get different results or worse, unrecognized incorrect results. Without a mechanism to manage these changes, the DBS/user is tasked with keeping the UDF versions synchronized with the corresponding queries. For example, a UDF may calculate the weighted value of 20 different inputs. The weighting of each input is embedded in the UDF. Over time, the user needs to change the weighting and therefore must update the UDF algorithm with a new weighting scheme. To get the same result of a given query requires for a given time period requires the use of the appropriate version of the UDF for that time period.

SUMMARY

In one aspect of the present disclosure, a database system may include a memory device configured to store a database dictionary and a processor in communication with the storage device. The processor may be configured to receive a temporal user-defined function. The processor may be further configured to store, in the database dictionary, the temporal user-defined function and a period of time over which to apply the temporal user-defined function.

In another aspect of the present disclosure, a method of operating a database system may include receiving, with a processor, a temporal user-defined function. The method may further include determining, with the processor, a period of time over which to apply the temporal user-defined function. The method may further include storing in a storage device with the processor, the temporal user-defined function and the period of time over which to apply the temporal user-defined function.

In another aspect of the present disclosure, a computer-readable medium is encoded with computer-executable instructions. The computer-executable instructions may be executable with a processor. The computer-readable medium may include instructions to receive a temporal user-defined function. The computer-readable medium may further include instructions to store the temporal user-defined function in a storage device. The computer-readable medium may further include instructions to determine a period of applicability of the temporal user-defined function. The computer-readable medium may further include instructions to store the period of applicability in the storage device.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is a block diagram of example operation of the example database system of claim 1.

FIG. 7 is an operational flow diagram of example operation of a database system.

DETAILED DESCRIPTION OF THE FIGURES

Figure 1:
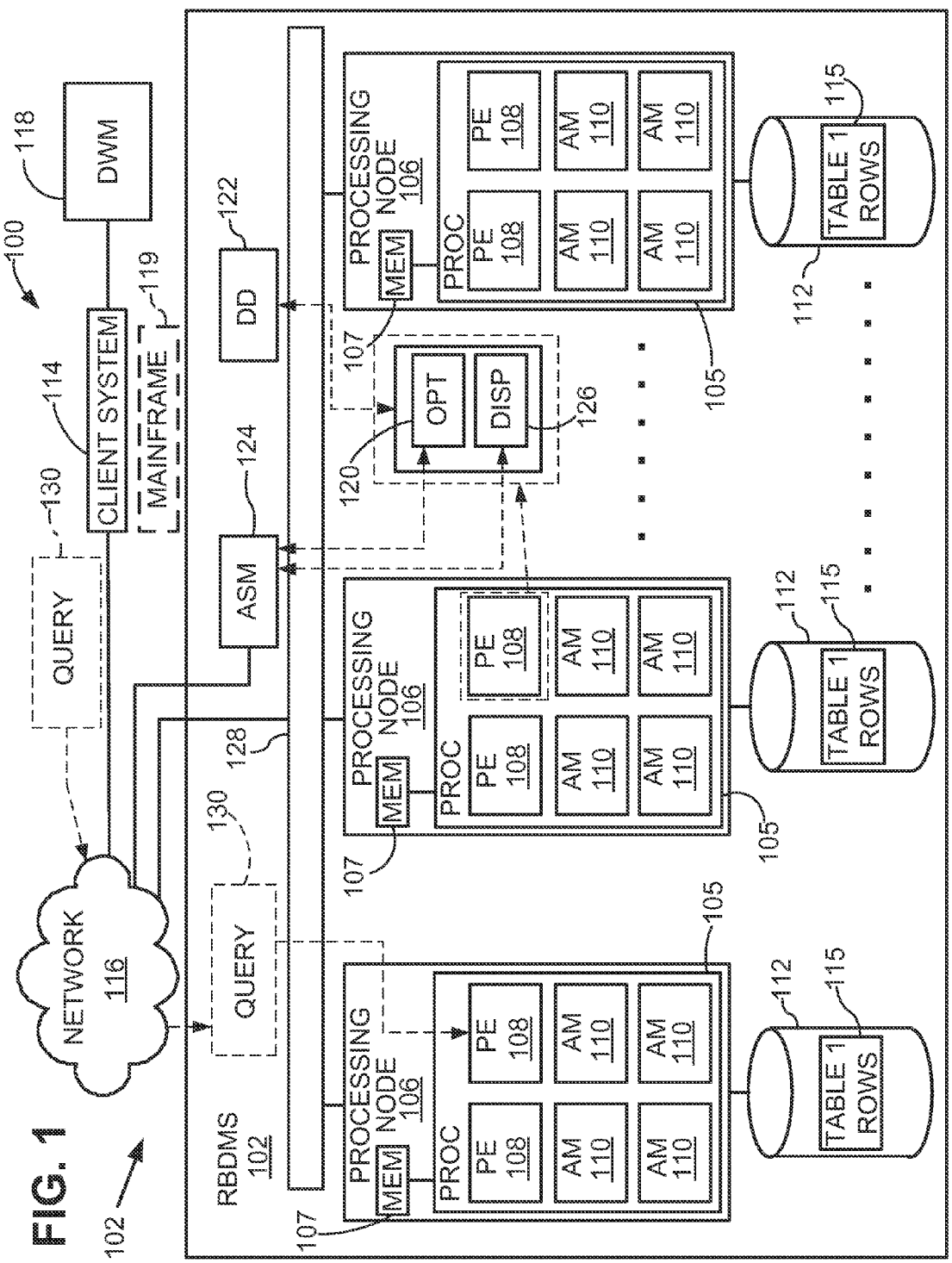
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RBDMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RBDMS 102 may include an active system management (ASM) module 124. The ASM module 124 may be implemented as a "closed-loop" system management (CLSM) architecture capable of satisfying a set of workload-specific goals. In other words, the RBDMS 102 is a goal-oriented workload management system capable of supporting complex workloads and capable of self-adjusting to various types of workloads. The ASM module 124 may communicate with each optimizer module 120, as shown in FIG. 1, and is adapted to convey a confidence threshold parameter and associated parameters to the optimizer module 120 in communication. Further, the ASM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the ASM module 124 via the network 116.

The ASM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the ASM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
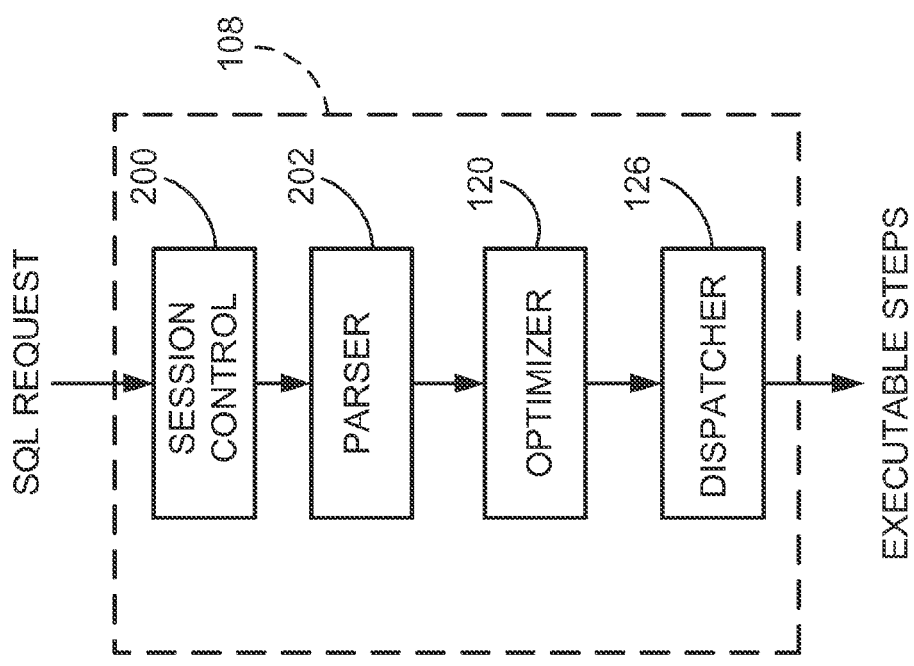
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
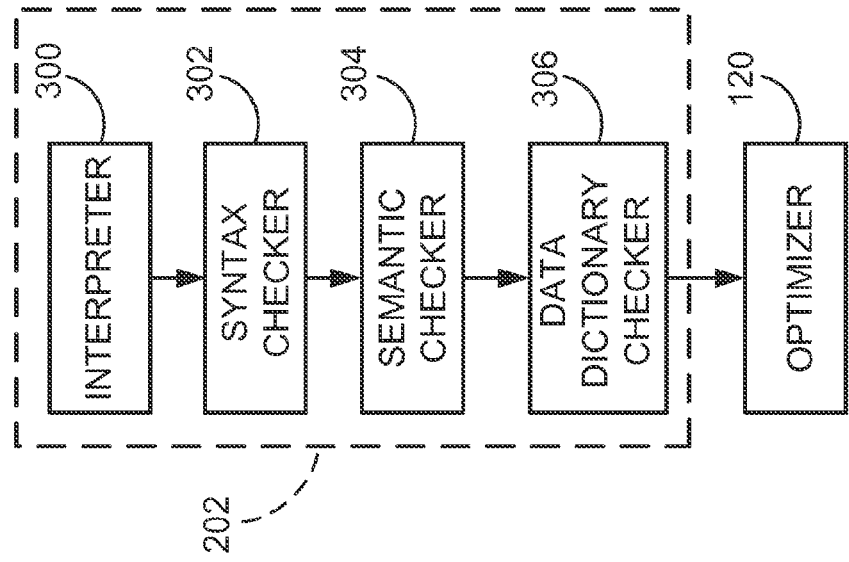
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the ASM 124 is configured to monitor runtime exception criteria. The ASM 124 monitoring takes place by communicating with the dispatcher module 126 as it checks the query execution step responses from the access modules 110. The step responses include the actual cost information, which the dispatcher module 126 may then communicate to the ASM 124 which, in turn, compares the actual cost information with the estimated costs of the optimizer module 120.

In one example, the RBDMS 102 may include temporal database management system functionality that includes built-in support for reasoning with time such as a temporal data model, temporal constraints, and a temporal version of SQL (or other suitable database language). A temporal database may be a database capable of inherently storing data (i.e., without the use of user-defined date or timestamp columns, or the like) that relates to time instances. Such a database provides temporal data types and stores information related to the past, present, and future. For example, such a temporal database might store an inventory history or the movement of employees within an organization. While a conventional database can maintain temporal data, it is typically done using user-defined date or timestamp columns, or the like, which are maintained in a temporal manner.

Various fundamental kinds of time in a temporal database may be implemented in a temporal database such as Transaction Time, Valid Time, and user-defined times that are un-interpreted time values. These kinds should not be considered limiting and are explicitly provided for example purposes. Such times typically are defined as Date-Time data types or Period data types. In one embodiment, Date-Time data types are conventional types. In one embodiment, Period data types define a time period and include a beginning element that defines the beginning of the time period and an ending element that defines the end of the time period.

Transaction Time, is typically defined as a Period data type with an element type of TIMESTAMP, and is defined to denote the time period beginning when a fact was first known (or recorded) in the database and ending when superseded by an update to the fact when the fact is deleted. A row in a table with Transaction Time can be an open row or a closed row. An open row is defined to be a row in which the Transaction Time end time is UNTIL_CLOSED. A closed row is a row in which the Transaction Time end time is not UNTIL_CLOSED (i.e., the row is closed in Transaction Time). In one embodiment, the UNTIL_CLOSED literal has a value associated with a time far in the future, such as the year 9999. In a Transaction Time table, an open row is also called a current row and a closed row is also called a history row. In one embodiment, there is no concept of a future row in the Transaction Time dimension because the system maintains the Transaction Time column such that a Transaction Time begin time is never in the future and a Transaction Time end time is either UNTIL_CLOSED or in the past.

Database queries, such as the query 130 (see FIG. 1) may implement user-defined functions. User-defined functions (UDFs) may refer to user-generated functions that extend the functionality of a database server. In one example, temporal table characteristics may be applied to a UDF. Such characteristics may allow a UDF to be time-dependent, such that the UDF may have multiple version having variations with respect to time. Existence of the various versions allows a UDF version associated with a specific period of time to be executed allowing consistent results for a particular period of time. For example, the data definition language (DDL) for creating a UDF on Jan. 2, 2010 may be as follows:

Create FUNCTION UDF_X
(ain int)
RETURNS INTEGER
LANGUAGE C
NO SQL
PARAMETER STYLE SQL
EXTERNAL NAME 'cs!ADDIT!ADDIT_2010.C'
TEMPORAL ON;

This DDL creates the UDF "UDF_X." The DDL calls for use of a UDF source file "addit_2010.c." The DDL also utilizes a temporal style string "TEMPORAL ON|OFF." The "TEMPORAL ON|OFF" style string indicates whether or not the UDF is to be treated as temporal UDF. For example, if the DDL include "TEMPORAL OFF," the UDF is treated as traditional non-temporal UDF. If however the DDL includes "TEMPORAL ON," the UDF is treated as a temporal UDF. When the above DDL is processed, the function UDF_X may be stored in the data dictionary module 122.

At another point in time, Aug. 8, 2011, for example, another version of UDF_X may be created using a new UDF source file of "addit_2011.c." The DDL for the new version of UDF_X is:

Replace FUNCTION UDF_X
(ain int)
RETURNS INTEGER
LANGUAGE C
NO SQL
PARAMETER STYLE SQL
EXTERNAL NAME 'cs!ADDIT!ADDIT_2011.C'
TEMPORAL ON;

Upon creation of the new version, the data dictionary module 122 will maintain both versions. Table 1 provides a portion of the data dictionary module 122 containing temporal UDF's.

TABLE 1

| UDF name | version | Transaction Time |
|---|---|---|
| UDF_X | 0 | (2010-01-02 12:00:00 123456, 2011-08-08 12:10:10 123456) |
| UDF_X | 1 | (2011-08-08 12:10:10 123456, until_closed) |
| UDF_Y | 0 | (2009-01-01 12:10:10 123456, 2011-03-04 12:10:10 123456) |
| UDF_Y | 1 | (2011-03-04 12:10:10 123456, until_closed) |

In Table 1, UDF versions for UDF_X and UDF_Y exist. As indicated by Table 1, the earlier versions are associated with older UDF's. With respect to UDF_X, as described in the example scenario, the version of UDF_X created on Jan. 2, 2010 (version 0) is replaced by the version created on Aug. 8, 2011 (version 1). Following Transaction Time convention, version 0 of UDF_X is closed upon creation of version 1. Similarly in Table 1, UDF_Y is shown as having two versions, one of which is closed (version 0). The version column in Table 1 is for purposes of example and is not typically stored in the data dictionary module 122, since the Transaction Time data may be used to select a desired version.

Other management features for temporal UDFs may exist. In scenarios in which alternative UDFs are desired for specific time periods, the DDL include a "nontemporal replace" command, which replaces the UDF versions for that specific time periods. For example, an external source file update may be desired, which can be used to replace the external source file associated with the current UDF. Use of a "nontemporal drop" of the UDF deletes all UDF versions, including the current version.

Various database languages, such as structured query language (SQL), may utilize the temporal UDF's. In one example, temporal UDFs may inherit a query level UDF transaction time "UDFTIME" and may use an "AS OF" transaction time operation to override query level transaction time. The override allows rewriting temporal queries when a temporal UDF version changes. An example regarding SQL-based query level UDF transaction time statement using the override may be as follows:

UDFTIME as of timestamp '2010-02-02 12:10:10.000000+00:00'

With regard to Table 1, using this particular timestamp, providing the SQL statement of:

SELECT UDF_X(a), UDF_Y(b) from userTable;
would select version 0 for both UDF_X and UDF_Y from some table (userTable) that may include the UDFs in the data dictionary 122. In another example, a query may provide the following UDFTIME:

UDFTIME as of timestamp '2011-01-02 12:10:10.000000+00:00'

Based on this timestamp, the SQL statement of:
SELECT UDF_X(a), UDF_Y(b) AS OF TIMESTAMP '2010-12-01 12:10:10.000000+00:00' from userTable;
would select version 0 for UDF_X, which uses the query level UDFTIME, and would select version 1 for UDF_Y, which uses the override to provide respective timestamp. If no UDF Transaction Time is provided, all temporal UDFs use the respective current versions.

FIG. 4 is block diagram of an example of the RBDMS 102 during the processing of a new version of a previously existing UDF. Using the example UDF_X, a new version may be created on Feb. 4, 2012 that implements a source file addit_2012.c. In such a scenario, the RBDMS 102 may determine process the DDL of the UDF to determine that a new version is to be created. In one example, an access module 110 may receive the new version 400 of UDF_X, which may be transmitted by a parsing engine module along with instructions regarding the processing of the new version 400.

Upon receipt of the new version 400 of UDF_X, the access module 110 may determine if the Transaction Time of the current version requires alteration. In FIG. 4, version 1 of UFD_X should be closed since a new version has been created as indicated in the UDF table 402 stored in the data dictionary module 122. The new version 400 UDF_X may be added to the UDF table 402 with the appropriate Transaction-Time-based time period information.

Figure 5:
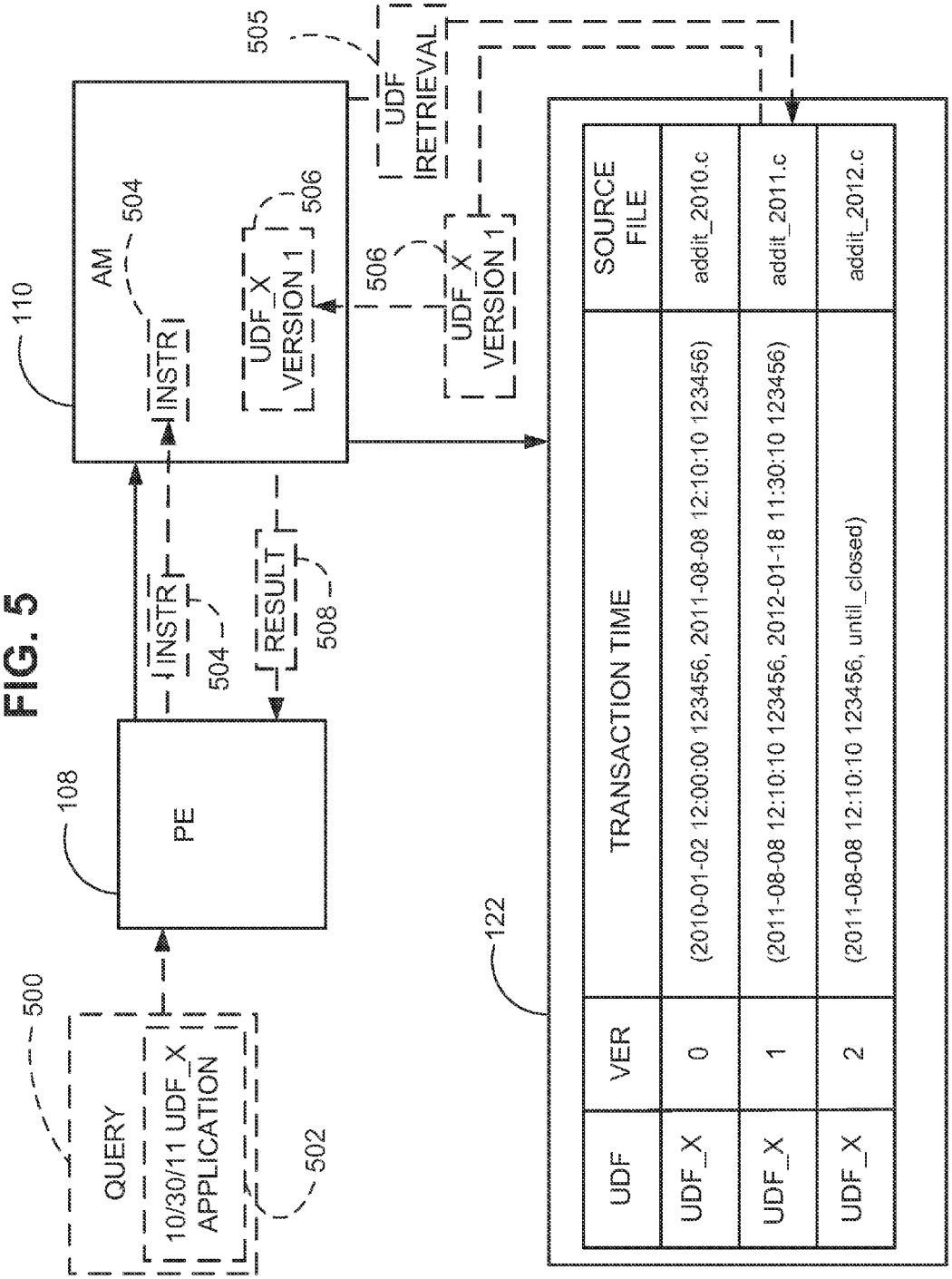
FIG. 5 is a block diagram of example operation of the example database system of claim 1.

FIG. 5 is a block diagram of the RBDMS 102 during retrieval of a particular UDF version in response to a particular query. In one example, a query may be processed by a parsing engine module 108 and various instructions generated to provide the access modules 110 in order to retrieve and process data associated with the query. FIG. 5 is an example of a query 500 processed by the RBDMS 102. The query 500 may require various operations to be performed by processing nodes 110 in order to properly respond to the query 500. The query 500 may include a temporal UDF-based operation, such as applying a temporal UDF for a particular point in time. For example, the query 500 may include temporal UDF-based task 502, which requests application of UDF_X for a date of Oct. 30, 2011.

The parsing engine module 108 may process the query 500 and provide instructions 504 to the access module 110. The instructions 504 may direct the access module 110 to retrieve the appropriate version of UDF_X. Based on the contents of the temporal UDF-based task 502, version 1 of UDF_X is the appropriate version. The access module 110 may perform the UDF retrieval 505 from the data dictionary module 122.

Upon retrieval of version 1 506 of UDF_X, the access module 110 may process the temporal UDF-based task 502 and generate a result 508. The access module 110 may also retrieve or receive relevant data (not shown) against which UDF_X may to be applied. The result 506 may be returned to the parsing engine module 108 for subsequent organization with any other results returned by the access module 110 or other access modules 110.

Figure 6:
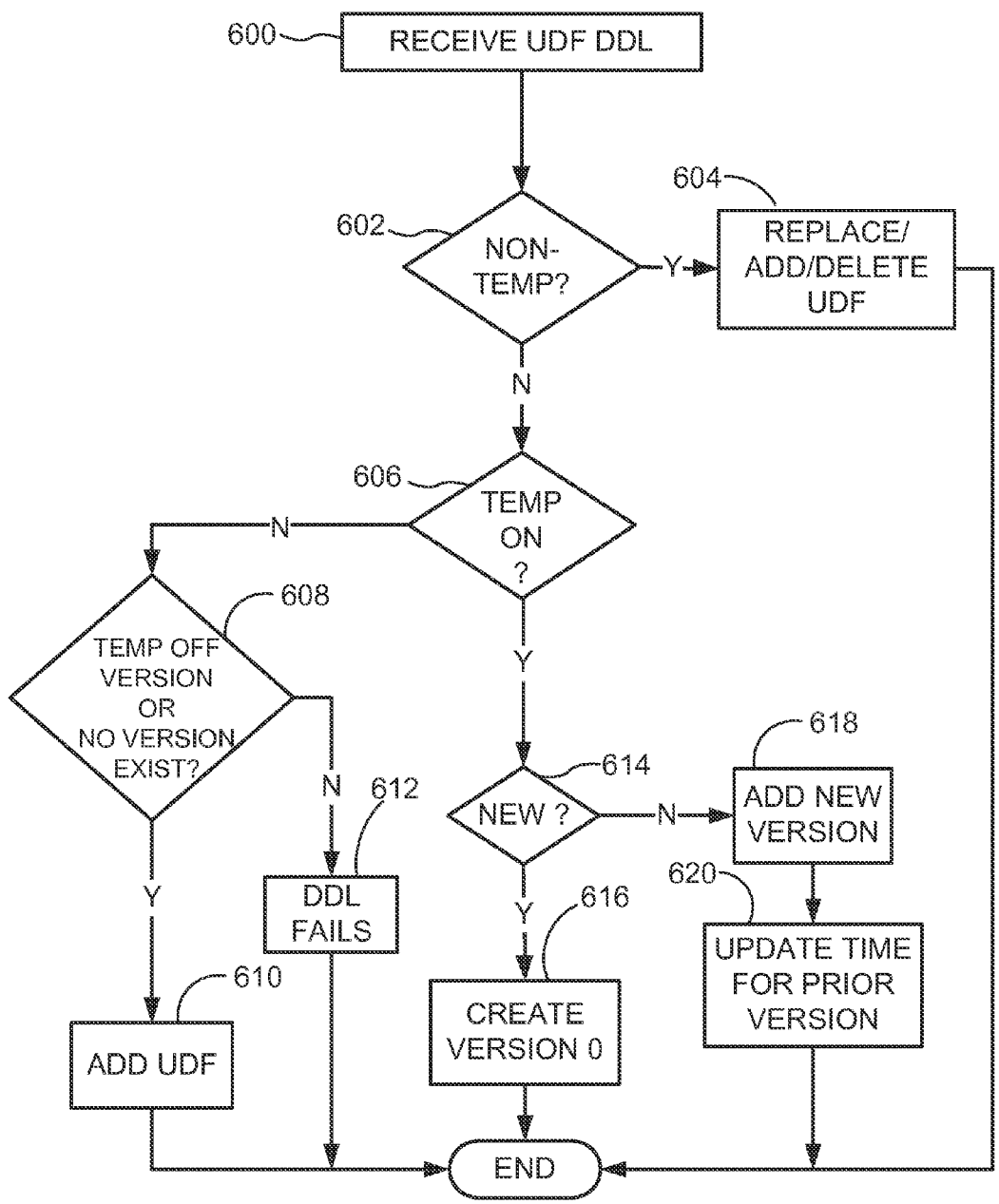
FIG. 6 is an operational flow diagram of example operation of a database system.

FIG. 6 is an operational flow diagram of the RBDMS 102 during example receipt of a temporal UDF. In one example, the RBDMS 102 may receive the DDL for a UDF (600). Upon receipt of the DDL for the UDF, the RBDMS 102 may determine if the UDF is a nontemporal UDF (602). If the UDF includes a "nontemporal" DDL statement, the RBDMS 102 may replace the specified version(s) of the UDF without changing the replaced version's Transaction Time (604). If the "nontemporal replace" does not specify the version, the current version of the UDF will be replaced. If the UDF includes a "nontemporal drop" DDL statement, all version of the UDF will be deleted.

If the "nontemporal" statement is not in the DDL, the RBDMS 102 may determine the status of the temporal on/off statement (606). If the "Create/Replace" DDL indicates "temporal off" or has no temporal style string, the RBDMS 102 may determine if either a "temporal off" version already exists or no UDF version exists (608). If either condition is true, the UDF may be added to the data dictionary module 122 (610). If the data dictionary module 122 already has a "temporal" version of this UDF, then this DDL fails (612). If the DDL indicates "temporal on," the RBDMS 102 may determine if the temporal UDF is new (614). If the temporal UDF is new, the UDF may be added to the data dictionary module 122 with the appropriate Transaction Time (616). If the temporal UDF is not new, then other versions exist. If other versions exist, the RBDMS 102 may add the new version to the data dictionary module 122 (618), which includes the appropriate Transaction Time and additional data, such as the external source files. The RBDMS 102 may also update the Transaction Time for the latest, prior version indicating that it is now closed (620).

FIG. 7 is an operational flow diagram of example query processing of the RBDMS 102. In one example, a query containing a UDF-based task, such as the query 500, may be received by the RBDMS 102 (700). The RBDMS 102 may determine if the UDF-based task is associated with a temporal UDF (702). If the UDF is not a temporal UDF, the RBDMS 102 may retrieve the UDF for processing of the query (704). If the UDF-based task is associated with a temporal UDF, the RBDMS 102 may determine if an override timestamp exists (706), such as through the "AS OF" command for SQL-based queries. If the override timestamp exists, the temporal UDF version for the override timestamp may be retrieved (708) and subsequently executed in accordance with the query (710).

If no override timestamp exists, the RBDMS 102 may determine if a query level timestamp exists (712). If a query level timestamp exists, the version of the temporal UDF may be retrieved that covers the date of the query level timestamp and may be executed in conformance to the query (710). If no query level timestamp exists, the UDF version covering the current time (e.g., query run time) may be retrieved (716) and executed.

The operational flow diagram of FIG. 7 may be executed for multiple UDFs in parallel, such as in instances when multiple temporal UDFs are called in a single SQL "SELECT" statement. Thus, the operations of FIG. 7 may occur simultaneously for different UDFs and the operations may be performed in an order other than that specifically described. For example, a query level timestamp may be identified prior to determining the presence of override timestamps. Other variations may also be considered in other examples.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A database system comprising:
a storage device configured to store a database dictionary;
a processor in communication with the storage device, the processor configured to:
receive a plurality of related versions of a temporal user-defined function;
store, in the database dictionary, the plurality of related versions of the temporal user-defined function and a respective time period for each related version of the temporal user-defined function over which to apply each related version of the temporal user-defined function, wherein each related version of the temporal user-defined function is configured to be selectively applied based on the respective time period;
receive a database query comprising a request to apply the temporal user-defined function to database data for a specified time;
in response to the specified time contained in the database query, select a version from the plurality of related versions of the temporal user-defined function having a respective time period that contains the specified time; and
apply the selected version of the temporal user-defined function to the database data in performance of at least a portion of the database query.

2. The database system of claim 1, wherein the processor is further configured to:
receive another related version of the temporal user-defined function; and
update at least one respective time period associated with a version of the plurality of related versions of the temporal user-defined function to indicate existence of the received another related version of the temporal user-defined function.

3. The database system of claim 1, wherein the processor is further configured to store each respective time period according to Transaction Time format.

4. The database system of claim 1, wherein each time period associated with the plurality of related versions of the temporal user-defined function includes a respective begin-usage time indicative of when to begin usage of a corresponding version of the temporal user-defined function and a respective end-usage time indicative of when to end usage of the corresponding version of the temporal user-defined function, wherein the end-usage time of a most current version is indefinite.

5. The database system of claim 1, wherein the processor is further configured to:
receive a second database query, wherein the second database query includes at least one request to apply a version of the plurality of related versions of the temporal user-defined function to database data at a second specified time;
in response to receipt of the second database query, select a second version of the plurality of related versions of the temporal user-defined function having a time period that contains the second specified time; and
apply the selected second version of the temporal user-defined function to the database data in the request of the second database query.

6. The database system of claim 5, wherein the processor is further configured to:
determine a query-level time based on the second database query; and
select a version of the plurality of related versions of the temporal user-defined function having a respective time period that includes the query-level time.

7. The database system of claim 6, wherein the processor is further configured to:

determine an override time for the query-level time based on the second database query;

select a version of the plurality of related versions of the temporal user-defined function having a respective time period that includes the override time.

8. A method of operating a database system, the method comprising:

receiving, with a processor, a plurality of related versions of a temporal user-defined function;

storing, with the processor, in a storage device, the plurality of related versions of the temporal user-defined function and a respective time period for each related version of the temporal user-defined function over which to apply each related version of the temporal user-defined function, wherein each related version of the temporal user-defined function is configured to be selectively applied based on the respective time period;

receiving, with the processor, a database query comprising a request to apply the temporal user-defined function to database data for a specified time;

in response to the specified time contained in the database query, selecting, with the processor, a version from the plurality of related versions of the temporal user-defined function having a respective time period that contains the specified time; and applying, with the processor, the selected version of the temporal user-defined function to the database data to the database data in performance of at least a portion of the database query.

9. The method of claim 8 further comprising:

receiving, with the processor, another related version of the temporal user-defined function;

selecting, with the processor, the another related temporal user-defined function as a current version of the temporal user-defined; and updating, with the processor, a respective time period of at least one of the plurality of related versions of the temporal user-defined function stored in the storage device in response to the selection of the received another related version of the temporal user-defined function as the current version.

10. The method of claim 8, further comprising:

receiving, with the processor, a non-temporal update of the temporal user-defined function, wherein the non-temporal update includes another related version of the temporal user-defined function;

in response to receipt of the non-temporal update, replacing, with the processor, a stored version of the temporal user-defined function with the another related version of the temporal user-defined function; and associating, with the processor, the respective time period of the replaced version of the temporal user-defined function with the another related version.

11. The method of claim 8 further comprising:

receiving, with the processor, an update to a respective time period of one of the plurality of related versions of the temporal user-defined function, wherein the update includes a different time period from the stored time period to be updated; and replacing, with the processor, the stored time period to be updated with the different time period in the storage device.

12. The method of claim 11, further comprising rejecting, with the processor, the update to the respective time period in response to the different time period overlapping a respective time period associated with another related version of the plurality of related versions of the temporal user-defined function stored in the storage device.

13. The method of claim 11, further comprising:

receiving, with the processor, a second database query including a query level time to be used during formation of a response to the second database query, wherein the second database query includes a request to apply the temporal user-defined function;

in response to receipt of the second database query, selecting, with the processor, a second version from the plurality of related versions of the temporal user-defined function having a respective time period that includes the query level time; and applying, with the processor, the selected version of the temporal user-defined function in accordance with the second database query.

14. The method of claim 13, wherein each of the respective periods of time is non-overlapping with each other.

15. A non-transitory computer-readable medium encoded with a plurality of instructions executable with a processor, wherein the plurality of instructions comprises:

instructions to receive a plurality of related versions of a temporal user-defined function;

instructions to store the plurality of related versions of the temporal user-defined function and a respective time period for each related version of the temporal user-defined function over which to apply each related version of the temporal user-defined function version in a storage device, wherein each related version of the temporal user-defined function is configured to be selectively applied based on the respective time period;

instructions to receive a database query comprising a request to apply the temporal user-defined function to database data for a specified time;

in response to the specified time contained in the database query, instructions to select a version from the plurality of related versions of the temporal user-defined function having a respective time period that contains the specified time; and instructions to apply the selected version of the temporal user-defined function to the database data in performance of at least a portion of the database query.

16. The non-transitory computer-readable medium of claim 15, wherein the instructions to store the plurality of related versions of the temporal user-defined function and a respective time period for each related version of the temporal user-defined function over which to apply each related version of the temporal user-defined function in a storage device comprise instructions to determine a respective beginning time to apply each related version of the temporal user-defined function and a respective end time to apply each related version of the temporal user-defined function version, wherein a period of time between each respective beginning time and each respective end time defines each respective time period.

17. The non-transitory computer-readable medium of claim 15, wherein the instructions to store the plurality of related versions of the temporal user-defined function and a respective time period over which to apply each related version of the temporal user-defined function in a storage device comprise instructions to store each respective time period according to Transaction Time format.

18. The non-transitory computer-readable medium of claim 15, wherein the plurality of instructions further comprises:

instructions to receive another related version of the temporal user-defined function; and instructions to update, in the storage device, a respective time period of a most current version of the plurality of related versions of the temporal user-defined function, wherein the update is indicative of the addition of the received another related version.

19. The non-transitory computer-readable medium of claim 18, wherein the instructions to update comprise:
   instructions to identify a beginning time of a respective time period of the another related temporal user-defined function; and
   instructions to update an end time of the respective time period of a version of the temporal user-defined function with the respective beginning time of the respective time period of the another related version of the temporal user-defined function.

20. The non-transitory computer-readable medium of claim 15, wherein the plurality of instructions further comprises:
   instructions to receive a non-temporal update of the temporal user-defined function, wherein the non-temporal update includes another related version of the temporal user-defined function;
   in response to receipt of the non-temporal update, instructions to replace one of the stored plurality of related versions of the temporal user-defined function with the another related version of the temporal user-defined function; and
   instructions to associate the respective time period of the replaced version of the temporal user-defined function with the another related version.

* * * * *